(12) United States Patent
Chen

(10) Patent No.: US 11,061,269 B2
(45) Date of Patent: Jul. 13, 2021

(54) ARRAY SUBSTRATE AND DISPLAY PANEL

(71) Applicants: HKC CORPORATION LIMITED, Shenzhen (CN); CHONGQING HKC OPTOELECTRONICS TECHNOLOGY CO.,LTD., Chongqing (CN)

(72) Inventor: Yu-Jen Chen, Chongqing (CN)

(73) Assignees: HKC Corporation Limited, Shenzhen (CN); Chongqing HKC Optoelectronics Technology Co., Ltd., Chongqing (CN)

(*) Notice: Subject to any disclaimer, the term of this patent is extended or adjusted under 35 U.S.C. 154(b) by 0 days.

(21) Appl. No.: 16/486,197

(22) PCT Filed: Sep. 12, 2017

(86) PCT No.: PCT/CN2017/101382
§ 371 (c)(1),
(2) Date: Aug. 15, 2019

(87) PCT Pub. No.: WO2018/233090
PCT Pub. Date: Dec. 27, 2018

(65) Prior Publication Data
US 2020/0057334 A1 Feb. 20, 2020

(30) Foreign Application Priority Data
Jun. 20, 2017 (CN) .......................... 201710471818.5

(51) Int. Cl.
*G02F 1/1335* (2006.01)
*G02F 1/1333* (2006.01)
(Continued)

(52) U.S. Cl.
CPC .. *G02F 1/133514* (2013.01); *G02F 1/133512* (2013.01)

(58) Field of Classification Search
None
See application file for complete search history.

(56) References Cited

U.S. PATENT DOCUMENTS

2004/0119921 A1* 6/2004 Chang ............... G02F 1/133555
349/114
2005/0270449 A1* 12/2005 Koma ............... G02F 1/133555
349/114
(Continued)

FOREIGN PATENT DOCUMENTS

JP 2003330014 A * 11/2003 ............... G02B 5/20

*Primary Examiner* — Edward J Glick
*Assistant Examiner* — Anthony G Quash
(74) *Attorney, Agent, or Firm* — Wang Law Firm, Inc.

(57) ABSTRACT

Disclosed an array substrate and a display panel, wherein the array substrate comprises a substrate, a plurality of pixel units disposed on the substrate, wherein each of the pixel units comprises a first pixel subunit, a second pixel subunit and a third pixel subunit, and a color filter disposed on each of the pixel subunits, wherein the color filter is located between the substrate and the second substrate, and the color filter of the third pixel subunit has a step structure. The display panel comprises the array substrate above and a second substrate, wherein the second substrate being disposed opposite to the array substrate.

6 Claims, 5 Drawing Sheets

(51) Int. Cl.
*G02F 1/1362* (2006.01)
*G02F 1/13357* (2006.01)
*G02F 1/23* (2006.01)

(56) References Cited

U.S. PATENT DOCUMENTS

| | | | | |
|---|---|---|---|---|
| 2006/0055848 A1* | 3/2006 | Kim | ........................ | G02B 5/201 |
| | | | | 349/107 |
| 2007/0196940 A1* | 8/2007 | Park | .................. | G02F 1/133516 |
| | | | | 438/22 |
| 2014/0078452 A1* | 3/2014 | Lu | ..................... | G02F 1/133514 |
| | | | | 349/106 |
| 2014/0375936 A1* | 12/2014 | Park | .................... | G02F 1/13394 |
| | | | | 349/106 |
| 2017/0110522 A1* | 4/2017 | Lee | .................... | H01L 51/5225 |

* cited by examiner

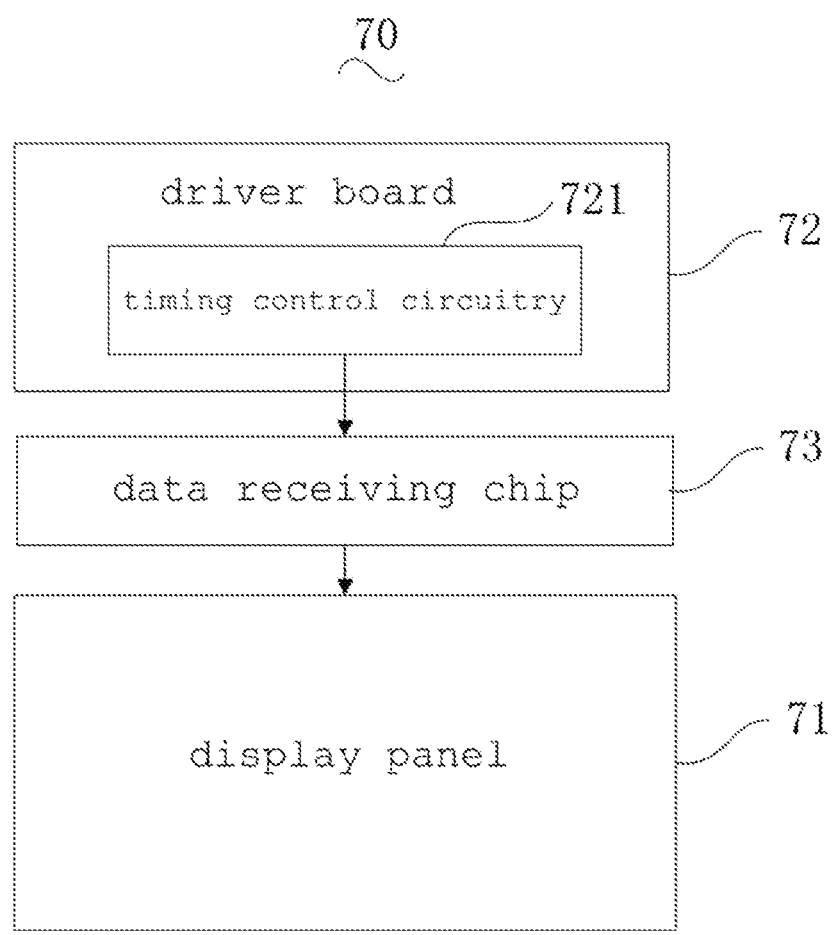

ARRAY SUBSTRATE AND DISPLAY PANEL

CROSS-REFERENCE TO RELATED APPLICATION

The present application claims priority to China Patent Application No. 2017104718185, filed on Jun. 20, 2017, titled "ARRAY SUBSTRATE AND DISPLAY PANEL", the entire contents of which are incorporated in the present application by reference.

BACKGROUND OF THE APPLICATION

Field of the Application

The field of present application involves a display, in particular involves an array substrate and a display panel.

Description of the Related Art

The liquid crystal display (LCD) devices have been most widely used among the various flat panel display devices. With the development of the display technology, the LCD panels are becoming increasingly large in size.

At present, most of the large-sized display panels apply a negative vertical alignment (VA) type liquid crystal or in-plane switching (IPS) liquid crystal technology. The VA type liquid crystal technology has the advantages of higher production efficiency and lower manufacturing cost than the IPS liquid crystal technology, but has more significant defects in term of the optical properties thereof than the IPS liquid crystal technology. The large-size panels require the larger perspective presentation, particularly in the commercial applications; however, the drive circuit for driving the VA type liquid crystal display devices often cannot meet the market application requirement due to color shift at different viewing angles. For example, as the voltage increases, the brightness saturation tendency of the blue pixel subunit is more significant and faster than that of the red and green pixel subunits such that the bluish image quality defect is significantly presented at side viewing angles.

Generally, the method of solving color shift of the VA Type liquid crystal technology is to further subdivide each of RGB sub-pixels into main pixels/sub-pixels and apply the different driving voltages to the main pixels and the sub-pixels so as to improve the color shift defect at different viewing angles, but it is often necessary to design the additional metal trace or thin film transistor (TFT) components for driving the sub-pixels in such configuration of the pixel, so it only needs to sacrifice the transparent opening area result in affecting the transmittance of the panel, but also increases the backlight cost.

SUMMARY OF THE APPLICATION

The various embodiments of the present application provide an array substrate and a display panel.

The array substrate comprises a substrate; a plurality of pixel units disposed on the substrate, wherein each of the pixel units comprises a first pixel subunit, a second pixel subunit and a third pixel subunit; and a color filter disposed on each of the pixel subunits, wherein the color filter is located between the substrate and the second substrate, and the color filter of the third pixel subunit has a step structure.

In an embodiment, the color filter of the third pixel subunit is a blue color filter.

In an embodiment, the third pixel subunit and the second pixel subunit are disposed adjacent to each other in each of the pixel units, and a thickness of the step structure decreases along a direction away from the second pixel subunit.

In an embodiment, the second pixel subunit is disposed between the first pixel subunit and the third pixel subunit in each of the pixel units.

In an embodiment, the color filter of the third pixel subunit has a two-layered step structure.

In an embodiment, the two-layered step structure has a first thickness and a second thickness; the first thickness being greater than a thickness of the color filter of the second pixel subunit; and the second thickness being smaller than the thickness of the color filter of the second pixel subunit.

In an embodiment, the step structure in the color filter of the third pixel subunit near the second pixel subunit has the first thickness, and the step structure in the color filter of the third pixel subunit away from the second pixel subunit has the second thickness.

In an embodiment, the color filter of the third pixel subunit has an at least three-layered step structure.

In an embodiment, a thickness of the at least three-layered step structure uniformity decreases along a direction away from the second pixel subunit.

In an embodiment, a thickness of the at least three-layered step structure gradually decreases at a curve along a direction away from the second pixel subunit.

In an embodiment, the array substrate further comprises a light-shielding member formed on the substrate, and having an opening; the color filter being disposed at the opening of the light-shielding member.

In an embodiment, the first pixel subunit, the second pixel subunit and the third pixel subunit have a same contacting area with the substrate respectively.

The display panel comprises a first substrate; and a second substrate disposed opposite to the first substrate; the first substrate being any of the above array substrates. For example, the first substrate comprises a substrate; a plurality of pixel units disposed on the substrate, wherein each of the pixel units comprises a first pixel subunit, a second pixel subunit and a third pixel subunit; and a color filter is disposed on each of the pixel subunits, wherein the color filter is located between the substrate and the second substrate, and the color filter of the third pixel subunit has a step structure.

The display panel comprises a first substrate; and a second substrate disposed opposite to the first substrate; the first substrate comprises: a substrate; a plurality of pixel units disposed on the substrate, and a light-shielding member formed on the substrate, and having an opening; wherein each of the pixel units comprises a first pixel subunit, a second pixel subunit and a third pixel subunit; and the second pixel subunit is disposed between the first pixel subunit and the third pixel subunit; each of the pixel subunits of the substrate has a color filter disposed at the opening of the light-shielding member, the color filter is located between the substrate and the second substrate, and the color filter of the third pixel subunit has an at least three-layered step structure; and a thickness of the at least three-layered step structure uniformity decreases or gradually decreases at a curve along a direction away from the second pixel subunit.

According to the present application, the structures of the third pixel subunits are adjusted for the optical characteristic of the third pixel subunits, when the blue color filters are formed to have step structures, the short wavelength and high color shift conditions are compensated so as to realize a complementary optical effect, thereby solving the chromatic aberration and color shift problems of the display panel. The aforementioned processes for the array substrate are simple and can improve the display performance of the display device.

Through the adjustment of the blue pixel subunits in each of the pixel regions for the optical characteristics, it will be unnecessary to further subdivide the same pixel subunit and apply the different driving voltages to the subdivided pixel subunits respectively. Therefore, it will be unnecessary to design additional metal or TFT components for driving the sub-pixels so as to save the backlight cost, and unnecessary to sacrifice the transparent opening area so as to maintain good transmittance of the panel.

BRIEF DESCRIPTION OF THE DRAWINGS

In order to more clearly describe the technical solutions of the embodiments of the present application or of the conventional art, the accompanying drawings for the description of the embodiments or the conventional art will be briefly introduced below. It is apparent that the accompanying drawings in the following description are only some embodiments of the present application, one skilled in the art can obtain other drawings of other embodiments according to those accompanying drawings without any creative work.

FIG. 7 is a schematic structural diagram of a display device of an embodiment.

DETAILED DESCRIPTION OF THE PREFERRED EMBODIMENTS

For a better understanding of the present application, the more comprehensive descriptions of the present application will be provided with reference to the related accompanying drawings as follows. The accompanying drawings illustrate the preferred embodiments of the present application. However, the present application may be implemented in many different forms and is not limited to the embodiments described herein. Inversely, those embodiments are provided to more thoroughly and comprehensively understand the disclosure of the present application.

Unless defined otherwise, all technical and scientific terms used herein have the same meaning as commonly understood by one skilled in the art to which the present application belongs. The terminology used herein is for the purpose of describing specific embodiments only and is not intended to limit the present application. As used herein, the term "and/or" includes any and all combinations of one or more of the associated listed items.

For example, an array substrate comprises a substrate; a plurality of pixel units disposed on the substrate, wherein each of the pixel units comprises a first pixel subunit, a second pixel subunit and a third pixel subunit; and a color filter disposed on each of the pixel subunits, wherein the color filter is located between the substrate and the second substrate, and the color filter of the third pixel subunit has a step structure. In another example, the third pixel subunit is a blue pixel subunit.

For example, a display panel comprises a first substrate and a second substrate disposed to oppose each other; the first substrate comprises a substrate; a plurality of pixel units disposed on the substrate, wherein each of the pixel units comprises a first pixel subunit, a second pixel subunit and a third pixel subunit; and a color filter disposed on each of the pixel subunits, wherein the color filter is located between the substrate and the second substrate, and the color filter of the third pixel subunit has a step structure. In another example, the third pixel subunit is a blue pixel subunit, the first substrate has a TFT array formed thereon, or the second substrate has a TFT array formed thereon.

Figure 1:
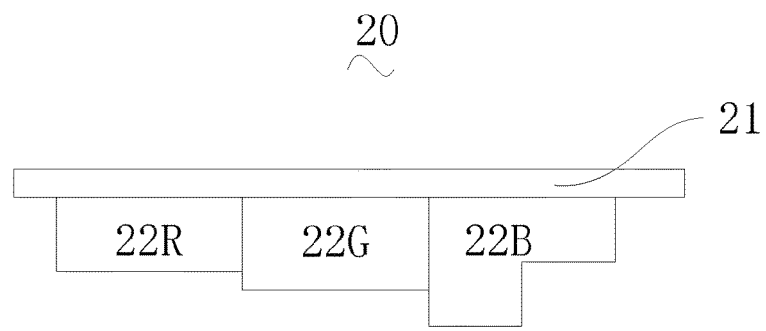
FIG. 1 is a schematic structural diagram of an array substrate of an embodiment.

For the sake of better understanding the above array substrates, please refer to FIG. 1, which is a schematic structural diagram of an array substrate of an embodiment. The array substrate 20 comprises a substrate 21; a plurality of pixel units disposed on the substrate, wherein each of the pixel units comprises a first pixel subunit, a second pixel subunit and a third pixel subunit; and a color filter 22 disposed on each of the pixel subunits, and different pixel subunits in the same pixel unit each has a color filter made of different materials, so the different pixel subunits in the same pixel unit may emit light of different colors. For example, the first pixel subunit may be a red pixel subunit, the second pixel subunit may be a green pixel subunit, and the third pixel subunit may be a blue pixel subunit, therefore the first pixel subunit may have a red color filter 22R disposed thereon, the second pixel subunit may have a green color filter 22G disposed thereon, and the third pixel subunit may have a blue color filter 22B disposed thereon. The color filter is located between the substrate 21 and the second substrate 30, and the color filter 22B of the third pixel subunit has a step structure.

In the embodiment, since the color filter in the third pixel subunit has different thicknesses due to the step structure, different gap distances form between the blue color filter and the second substrate in the third pixel subunit, wherein the gap distance between the blue color filter and the second substrate is also called a gap value. The optical characteristic parameter of each of the pixel subunits is related to the gap value, for example, an amount of phase delay of each of the pixel subunits is related to the gap value, the amount of phase delay may affect the change of polarization state of light so as to affect the brightness of light emitted from the pixel subunit. That is, the brightness of each of pixel subunits is related to the gap value and there are different curve relationships between the brightness and the gap value of the different pixel subunits at the same voltage.

In the embodiment, the third pixel subunit have different gap values, such that the curve of the optical characteristics of the third pixel subunit versus the voltage is equivalent to the mean value of the curve corresponding to the different gap values at side viewing angles, so as to brightness variation of the third pixel subunit may be controlled for the mixed light at side viewing angles such that the complementary brightness saturation tendency of the third pixel subunit at side viewing angles is controlled to approximate to that of the first pixel subunit and the second pixel subunit.

The brightness ratio of each of the red, green and blue pixel subunits may be maintained as the original ratio of the conventional technology by the complementary adjustment of the adjacent pixel units at a front viewing angle. That is, according to the embodiments of the present application, each of the red, green and blue pixel subunits exhibit the approximate saturation tendency at a front viewing angle and side viewing angles so as to improve the color shift conditions at side viewing angles.

Through the adjustment of the third pixel subunits in each of the pixel unit for the optical characteristics, it will be unnecessary to further subdivide the same pixel subunit and apply the different driving voltages to the subdivided pixel subunits respectively. Therefore, it will be unnecessary to design additional metal or TFT components for driving the sub-pixels so as to save the backlight cost, and unnecessary to sacrifice the transparent opening area so as to maintain good transmittance of the panel.

In an embodiment, as shown in FIG. 1, the third pixel subunit and the second pixel subunit are disposed adjacent to each other in each of the pixel units, and a thickness of the step structure decreases along a direction away from the second pixel subunit. For example, thickness of the step structure gradually decreases along a direction away from the second pixel subunit. In this way, the gap value of the blue pixel subunit is smaller and the brightness of light emitted from the blue color pixel subunit is lower at the position near the second pixel subunit, and the overall brightness of the third pixel subunit may be comprehensively adjusted and the overall brightness saturation tendency of the third pixel subunit at side viewing angles may be delayed such that it is approximate to that of the first pixel subunit and the second pixel subunit, thereby improving color shift condition at side viewing angles. The gap value of the blue pixel subunit is larger and the brightness of light emitted from the blue pixel subunit is higher at the position away from the second pixel subunit, and therefore, it is possible to compensate for the human eye that is less sensitive to blue light.

In an embodiment, the first pixel subunit, the second pixel subunit and the third pixel subunit have the same contacting area with the substrate respectively and the first pixel subunit and the second pixel subunit are disposed adjacent to each other, and the second pixel subunit is located between the first pixel subunit and the third pixel subunit. As such, it is advantageous that the three primary colors of red, green and blue are mixed to obtain various colors.

Figure 2:
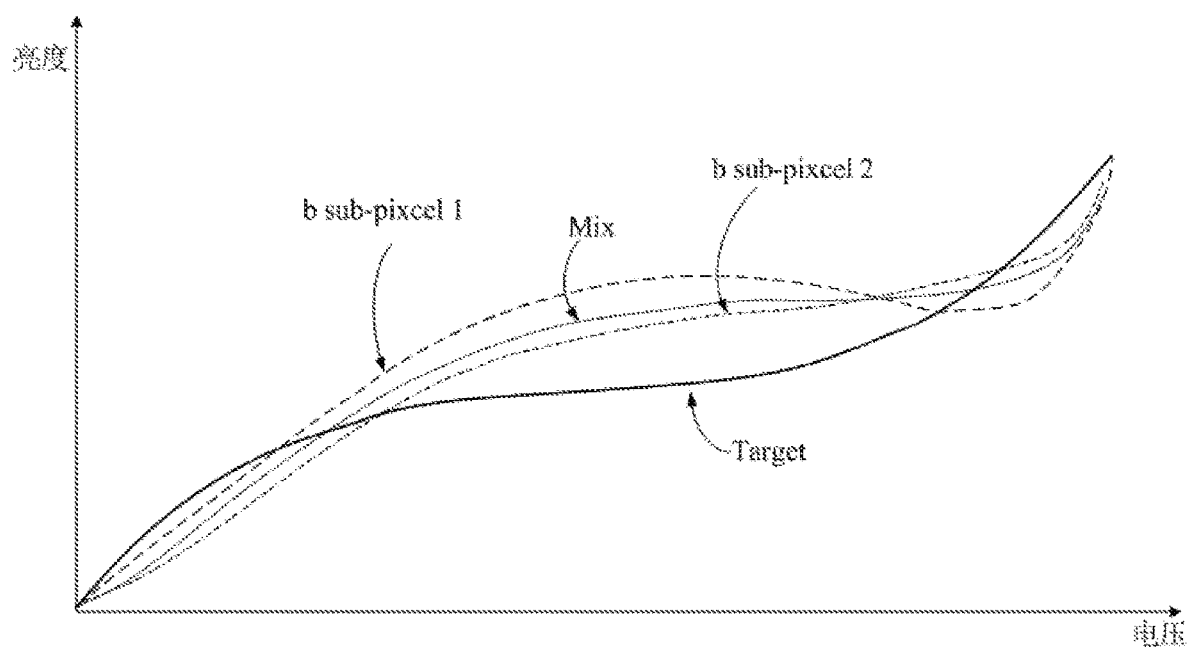
FIG. 2 is a schematic diagram of a variation curve of a brightness of a blue pixel subunit versus a voltage of an embodiment.

In an embodiment, the color filter of the third pixel subunit has two-layered step structure. In this way, the two-layered step structure has two different thicknesses, for example, a step near the second pixel subunit has a first thickness, and a step away from the second pixel subunit has a second thickness. In a preferred embodiment, the first thickness is larger than the thickness of the color filter of the second pixel subunit, and the second thickness is smaller than the thickness of the color filter of the second pixel subunit. At this time, as shown in FIG. 2, Target curve is a target variation curve of the brightness of the third pixel subunit versus the voltage, b sub-pixel 2 curve is a target variation curve of the brightness of the third pixel subunit versus the voltage corresponding to the first thickness, b sub-pixel 1 curve is a target variation curve of the brightness of the third pixel subunit versus the voltage corresponding to the second thickness. The Mix curve is a variation curve of the brightness of light emitted from the third pixel subunit having the two-layered step structure versus the voltage. As shown in FIG. 2, the Mix curve is more approximate to the target variation curve with respect to the b sub-pixel 1 curve and b sub-pixel 2 curve, that is, the brightness of light emitted from the third pixel subunit having the two-layered step structure described above is more satisfying regarding the color shift requirement at side viewing angles.

In an embodiment, the color filter of the third pixel subunit has more layers of step structure such that the variation curve of the overall brightness of the third pixel subunits versus the voltage at side viewing angles is more approximate to the target variation curve. For example, the color filter of the third pixel subunit has at least three-layered step structure. In this way, the more different gap values exist between the color filter of the third pixel subunit and the second substrate, the optical characteristic curve of the third pixel subunit can be adjusted more finely such that the displaying effect of the display panel is better. As another example, the color filter of the third pixel subunit has four-layered step structure such that the four different gap values exist between the color filter of the third pixel subunit and the second substrate and represented as B-Gap1, B-Gap2, B-Gap3 and B-Gap4 from small to large respectively, the amounts of the phase delay respectively corresponding thereto are represented as $\Delta nd_{B\text{-}Gap1}$, $\Delta nd_{B\text{-}Gap2}$, $\Delta nd_{B\text{-}Gap3}$ and $\Delta nd_{B\text{-}Gap4}$ respectively, since there is a difference between B-Gap1, B-Gap2, B-Gap3 and B-Gap4, the actual amounts of the phase delay of the third pixel subunit are equal to about a mean value of $\Delta nd_{B\text{-}Gap1}$, $\Delta nd_{B\text{-}Gap2}$, $\Delta nd_{B\text{-}Gap3}$ and $\Delta nd_{B\text{-}Gap4}$, and thus is able to generate a complementary optical effect to compensate the affect caused by chromatic aberration at different viewing angles.

Figure 3A:
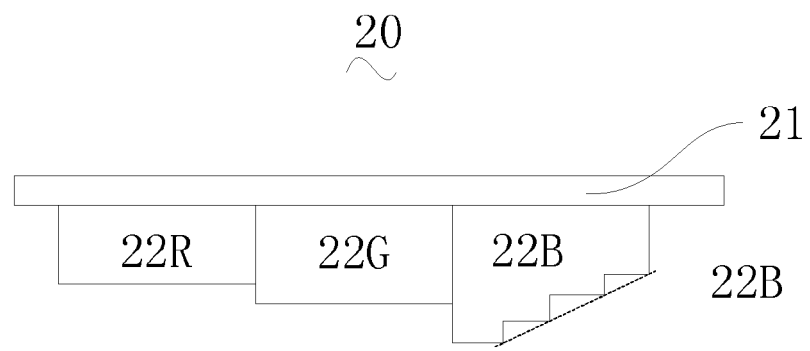
FIG. 3a is a schematic structural diagram of an array substrate of another embodiment.
Figure 3B:
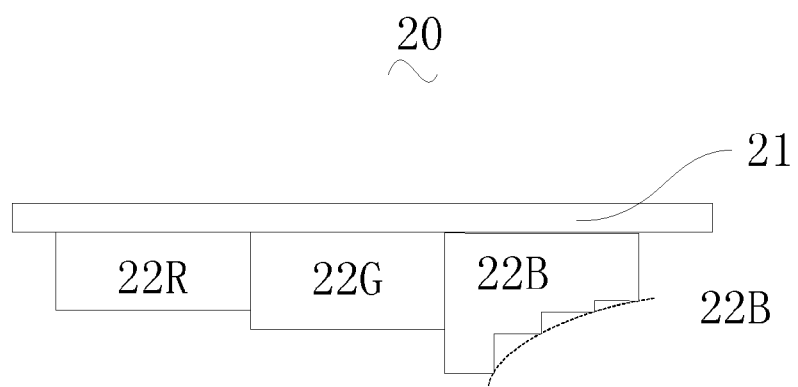
FIG. 3b is a schematic structural diagram of an array substrate of yet another embodiment.

As an embodiment, as shown in FIG. 3a, the thickness of the at least three-layered step structure uniformity decreases along a direction away from the second pixel subunit so as to simplify the manufacturing process for the color filter of the third pixel subunit. As another embodiment, as shown in FIG. 3b, the thickness of the at least three-layered step structure gradually decreases at a curve along a direction away from the second pixel subunit and thus the increasing tendency of the brightness of the blue pixel subunit along a direction away from the green pixel subunit would be more gradual, such that the mixed light of the blue light emitted from the blue pixel subunit, the red light emitted from the red pixel subunit and the green light emitted from the green pixel subunit is more uniform so as to improve the overall mixing effect of the display panel.

The array substrate further comprises a light-shielding member formed on the substrate, and having an opening; the color filter being disposed at the opening of the light-shielding member. As such, the light-shielding member having the opening can be considered as a black frame for enclosing each of the pixel subunits. The substrate is subdivided into a plurality of pixel units and each of the pixel units are subdivided into three pixel subunits such as red, green and blue pixel subunits by the light-shielding member having the opening. The opening of the light-shielding member is filled with the color filter having the corresponding color to prepare an array substrate, wherein the light-shielding member not only prevents the background light from leaking to improve display contrast, but also prevents the colors from mixing to increase the color purity. Optionally, the light-shielding member is made of a metal material such as Cr or a black resin material, for example, the thickness of the light-shielding member is greater than the thickness of the color filter. For example, the light-shielding member comprises a plurality of black unit bodies arranged in a regular matrix, each of the black unit bodies has an opening; the adjacent two black unit bodies are connected to each other and arranged tightly. Alternatively, the light-shielding member is a black frame having a plurality of openings, each of the openings are arranged in a matrix. The black frame is made of a metal material such as Cr or a black resin material.

Figure 4:
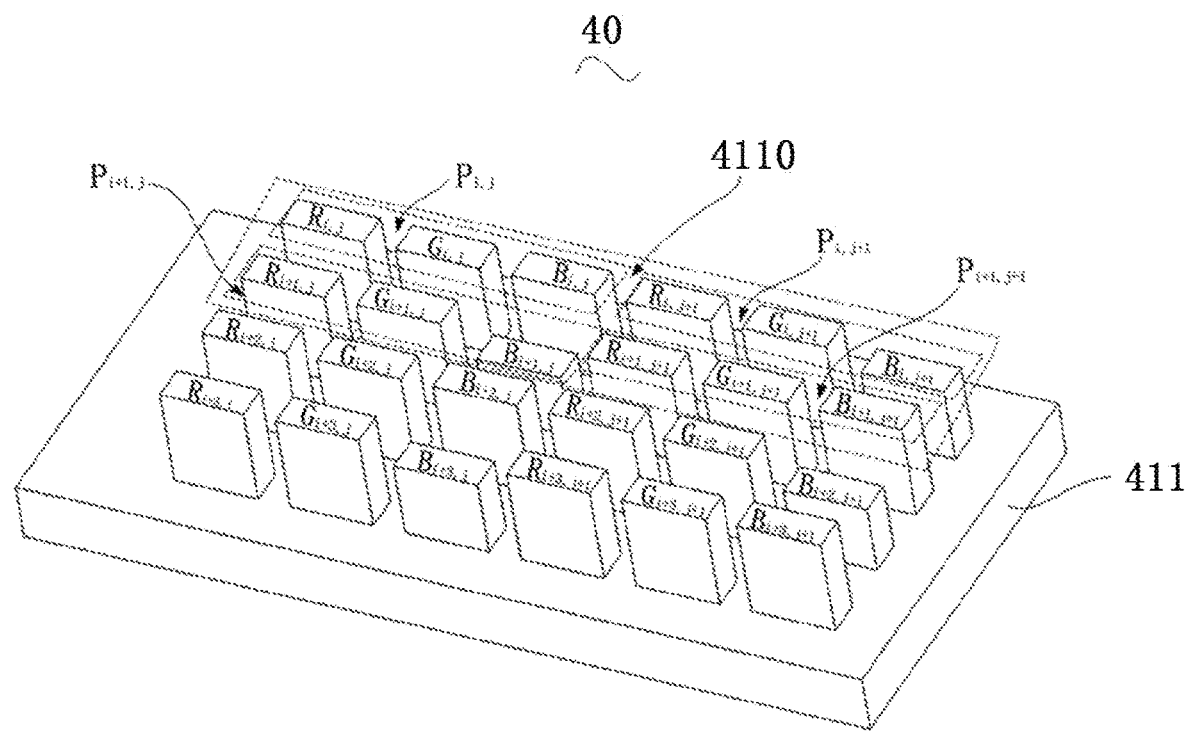
FIG. 4 is a schematic structural diagram of an array substrate of yet another embodiment.
Figure 5:
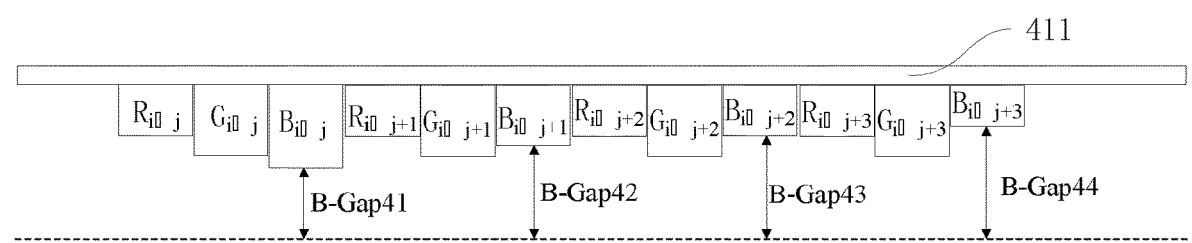
FIG. 5 is a schematic structural diagram of an array substrate of yet another embodiment.

Please refer to FIG. 4, which is a schematic structural diagram of an array substrate of an embodiment. The array substrate 40 comprises a substrate 41; a plurality of pixel regions 4110 disposed on the substrate, wherein each of the pixel regions 4110 comprises a plurality of pixel units P, each pixel units comprises a red pixel subunit, a green pixel subunit, and a blue pixel subunit. Each pixel subunits has a color filter disposed thereon, for example, the red pixel subunit may have a red color filter R disposed thereon, the green pixel subunit may have a green color filter G disposed thereon, and the blue pixel subunit may have a blue color filter B disposed thereon.

Specifically, the blue color filters of the two adjacent blue pixel subunits in each of the pixel regions have different thicknesses. For example, as shown in FIG. 4, the thickness of the blue color filter $B_{i+1, j}$ and the thickness of the blue color filter $B_{i, j+1}$ are different from the thickness of the blue color filter $B_{i, j}$ respectively; the thickness of the blue color filter $B_{i, j+1}$ and the thickness of the blue color filter $B_{j+1, j}$ are different from the thickness of the blue color filter $B_{i+1, j+1}$ respectively; wherein, $P_{i, j}$ represents the pixel unit at column i and row j, $B_{i, j}$ represents the blue color filter in the pixel unit at column i and row j.

In the embodiment, since the blue color filters of the two adjacent blue pixel subunits in the same pixel region have different film thicknesses, the gap distances between the blue color filters and the TFT substrates in the same pixel region are different, wherein the gap distance between the blue color filter and the TFT substrate is also called a gap value. The optical characteristic parameter of each of the pixel subunits is related to the gap value, for example, an amount of phase delay of each of the pixel subunits is related to the gap value, and the amount of phase delay may affect the change of polarization state of light so as to affect the brightness of light emitted from the pixel subunit. That is, the brightness of each of pixel subunits is related to the gap value and there are different curve relationships between the brightness and the gap value of the different pixel subunits at the same voltage.

In the embodiment, the plurality of blue pixel subunits have different gap values in the same pixel region, such that the curve of the optical characteristics of the blue pixel subunits in the same pixel region versus the voltage is equivalent to the mean value of the curve corresponding to the different gap values at side viewing angles, so the brightness variation of the blue pixel subunit may be controlled for the mixed light at side viewing angles such that the complementary brightness saturation tendency of the blue pixel subunit in the same pixel region at side viewing angles is controlled to approximate to that of the red pixel subunit and the green pixel subunit. The brightness ratio of each of the red, green and blue pixel subunits may be maintained as the original ratio of the conventional technology by the complementary adjustment of the adjacent pixel units at a front viewing angle. That is, according to the embodiments of the present application, each of the red, green and blue pixel subunits in the same pixel region exhibit the approximate saturation tendency at a front viewing angle and side viewing angles so as to improve the color shift condition at side viewing angles. Since the size of the pixel unit is very small, the size of the pixel region including the plurality of pixel units is also small, and thus it is difficult to distinguish the brightness difference of the single pixel in the pixel region, but instead the overall brightness of each of the display areas is observed, when viewed by the human eye. Therefore, the embodiments of the present application can ensure the uniformity of the overall display brightness while improving the color shift condition at side viewing angles.

It should be noted that in the embodiments of the present application, the blue photoresist films of the adjacent blue pixel subunits in the same pixel region have different thicknesses, and the plurality of blue pixel subunits in the same pixel region are together used to compensate chromatic aberration at different viewing angles, so it needs to sacrifice the resolution of the blue pixel subunit when performing signal adjustment. For example, the plurality of blue pixel subunits at the same column/row in the same pixel region are applied with the same voltage signal during the displaying time period of the same frame to realize an effect of compensating chromatic aberration at different viewing angles by using the photoresist films having different thicknesses.

Through the adjustment of the blue pixel subunits in each of the pixel regions for the optical characteristics, it will be unnecessary to further subdivide the same pixel subunit and apply the different driving voltages to the subdivided pixel subunits respectively. Therefore, it will be unnecessary to design additional metal or TFT components for driving the sub-pixels so as to save the backlight cost, and unnecessary to sacrifice the transparent opening area so as to maintain good transmittance of the panel.

In an embodiment, each of the pixel regions comprises a plurality of pixel units arranged in an array. Wherein, the number of columns of the pixel unit is different from the number of rows of the pixel unit in each of the pixel regions. Preferably, the number of columns is as same as the number of rows for the pixel region in each of the pixel regions that is the number of columns of the pixel unit is as same as the number of rows of the pixel unit, and the thickness of the blue color filter at column i and row j is same as that at the column j and row i, wherein i and j are all smaller than or equal to the number of columns.

In an embodiment, each of the pixel regions comprise four pixel units arranged in two columns and two rows that is the four pixel units are arranged in 2×2 matrix. As shown in FIG. 4, the one pixel region comprises four pixel units represented by $P_{i,j}$, $P_{i,j+1}$, $P_{i+1,j}$ and $P_{i+1,j+1}$ respectively, the blue color filters of the corresponding four blue pixel subunits thereof are represented by $B_{i, j}$, $B_{i, j+1}$, $B_{i+1, j}$ and $B_{i+1, j+1}$ respectively.

As an embodiment, the blue color filters of the blue pixel subunits in the two pixel units that are disposed diagonally have the same thickness, that is, the blue color filter $B_{i, j}$ and the blue color filter $B_{i+1, j+1}$ have the same thickness that is represented by B-CF21; the blue color filter $B_{i, j+1}$ and the blue color filter $B_{i+1, j}$ have the same thickness that is represented by B-CF22. Wherein, the gap value corresponding to the thickness B-CF21 is represented by B-Gap21, the gap value corresponding to the thickness B-CF22 is represented by B-Gap22. Since there are two different gap values in the same pixel region, the amount of phase delay of the entire pixel region is equal to about mean value of the amount of the phase delay corresponding to the two gap values such that the optical parameters of the entire pixel region are adjusted to realize a complementary optical effect, and thus the complementary brightness saturation tendency of the blue pixel subunit in the same pixel region approximates to that of the red pixel subunit and the green pixel subunit at side viewing angles, thereby improving the color shift condition at side viewing angles.

At this time, the plurality of blue pixel subunits at the same column/row in the pixel region are applied with the same voltage signal during the displaying time period of the same frame to realize an effect of compensating chromatic aberration at different viewing angles with the photoresist films having different thicknesses. For example, the timing control circuitry processes the initial driving voltages of each of the pixel subunits to convert the driving voltages of the plurality of blue pixel subunits at the same column/row in the pixel region into the mean value of the initial driving voltages of the blue pixel subunits at the column/row, and timing control circuitry outputs the processed driving voltage signal at the displaying time in the next frame or the subsequent frame thereof. Further, for example, the timing control circuitry receives the initial driving voltage signal for each of the pixel subunits at the displaying time of the Nth frame, wherein the initial driving voltages of the blue pixel subunits of the pixel $P_{i,j}$, the pixel $P_{i,j+1}$, the pixel $P_{i+1,j}$ and the pixel $P_{i+1,j+1}$ are represented by $BN_{i,j}$, $BN_{i,j+1}$, $BN_{i+1,j}$ and $BN_{i+1,j+1}$ respectively, the timing control circuitry processes the initial driving voltages $BN_{i,j}$, $BN_{i,j+1}$, $BN_{i+1,j}$ and $BN_{i+1,j+1}$. As a processing manner, the actual driving voltage applied to the blue pixel subunits of the pixel $P_{i,j}$ and the pixel $P_{i,j+1}$ is a mean value of $BN_{i,j}$ and $BN_{i,j+1}$, the actual driving voltage applied to the blue pixel subunits of the pixel $P_{i+1,j}$ and the pixel $P_{i+1,j+1}$ is a mean value of $BN_{i+1,j}$ and $BN_{i+1,j+1}$. As another processing manner, the actual driving voltage applied to the blue pixel subunits of the pixel $P_{i,j}$ and the pixel $P_{i+1,j}$ is a mean value of $BN_{i,j}$ and $BN_{j+1,j}$, the actual driving voltage applied to the blue pixel subunits of the pixel $P_{i,j+1}$ and the pixel $P_{i+1,j+1}$ is a mean value of $B_{Ni,j+1}$ and $BN_{i+1,j+1}$. The processed driving voltage signal (an actual driving voltage signal applied to each of the pixel subunits) is outputted to the display panel after delaying a time of at least one frame. Preferably, the timing control circuitry receives the initial driving voltage signal of each of the pixel subunits at the displaying time of the Nth frame, and outputs the processed driving voltage signal to each of the pixel units of the display panel at a displaying time of the N+1 frame, so the image information is transmitted to the display panel after delaying the time of one frame and the image is displayed after delaying the time of one frame.

The thicknesses of the blue color filters of any two adjacent blue pixel subunits in the array substrate are represented by B-CF21 and B-CF22 respectively. The brightness of light emitted from the above array substrate is more satisfying with the color shift requirement at side viewing angles compared to the array substrate with the blue color filter having uniform thickness of B-CF21 and the array substrate with the blue color filter having uniform thickness of B-CF22.

As another embodiment, the blue color filters of the blue pixel subunits of the four pixel units have different thicknesses in the same pixel region, which means that the four blue color filters have four different thicknesses in the same pixel region. For example, as shown in FIG. 1, the blue color filters $B_{i,j}$, $B_{i,j+1}$, $B_{i+1,j}$ and $B_{i+1,j+1}$ of the four blue pixel subunits of the pixel $P_{i,j}$, the pixel $P_{i,j+1}$, the pixel $P_{i+1,j}$ and the pixel $P_{i+1,j+1}$ have different thicknesses. At this time, a timing control circuit may be configured to process the initial drive voltage signal for each of the pixel subunits to convert the driving voltages of each of the blue pixel subunits in the pixel region into the mean value of the initial driving voltages of the four blue pixel subunits, and output the processed driving voltage signal at the displaying time in the next frame or the subsequent frame thereof.

In an embodiment, the variation curve of the overall brightness of the blue pixel subunit in each of the pixel regions versus a voltage at side viewing angles is more approximate to the target variation curve by using the color filters having more different thicknesses in each of the pixel regions. As such, there are more different gap values between the color filter of the blue pixel subunit and the TFT substrate in the same pixel region, and the optical characteristic curve of the blue pixel subunit can be adjusted more finely such that the displaying effect of the display panel can be better.

As an embodiment, each of the pixel regions comprises nine pixel units arranged in three columns and three rows that is the four pixel units are arranged in 3×3 matrix. For example, the nine pixel units in the pixel region are arranged in the following matrix:

$$\begin{pmatrix} P_{i,j} & P_{i,j+1} & P_{i,j+2} \\ P_{i+1,j} & P_{i+1,j+1} & P_{i+1,j+2} \\ P_{i+2,j} & P_{i+2,j+1} & P_{i+2,j+2} \end{pmatrix}$$

In an embodiment, the matrix of the film thicknesses of the blue color filters in each of the blue pixel subunits corresponding to the pixel matrix arranged in three columns and three rows is:

$$\begin{pmatrix} B\text{-}CF33 & B\text{-}CF32 & B\text{-}CF31 \\ B\text{-}CF32 & B\text{-}CF33 & B\text{-}CF32 \\ B\text{-}CF31 & B\text{-}CF32 & B\text{-}CF33 \end{pmatrix}$$

That is, the blue color filters of the blue pixel subunits of the pixel $P_{i,j}$, the pixel $P_{i+1,j+1}$ and the pixel $P_{i+2,j+2}$ have the same thickness, the blue color filters of the blue pixel subunits of the pixel $P_{i,j+1}$, the pixel $P_{i+1,j}$, the pixel $P_{i+1,j+2}$ and the pixel $P_{i+2,j+1}$ have the same thickness, the blue color filters of the blue pixel subunits of the pixel $P_{i,j+2}$ and the pixel $P_{i+2,j}$ have the same thickness. In a preferable embodiment, B-CF33>B-CF32>B-CF31. At this time, the three different gap values are between the color filter of the blue pixel subunits and the TFT substrate in the same pixel region and represented as B-Gap31, B-Gap32 and B-Gap33 from small to large respectively, the amounts of the phase delay respectively corresponding thereto are represented as $\Delta nd_{B\text{-}Gap31}$, $\Delta nd_{B\text{-}Gap32}$, $\Delta nd_{B\text{-}Gap33}$ and $\Delta nd_{B\text{-}Gap34}$ respectively, since there is a difference between B-Gap31, B-Gap32 and B-Gap33, the actual amount of the phase delay of the blue pixel subunit in the same pixel region is equal to about a mean value of $\Delta nd_{B\text{-}Gap31}$, $\Delta nd_{B\text{-}Gap32}$ and $\Delta nd_{B\text{-}Gap33}$, and thus it can realize a complementary optical effect to compensate an affect caused by chromatic aberration at different viewing angles, thereby improving color shift at side viewing angles.

In order to realize a better color shift effect, as an embodiment, the timing control circuitry processes the initial driving voltage signal for each of the pixel subunits such that the processed driving voltage of the pixel $P_{i,j}$, the pixel $P_{i,j+1}$ and the pixel $P_{i,j+2}$ is a mean value of the initial driving voltage thereof; the driving voltages of the pixel $P_{i+1,j}$, the pixel $P_{i+1,j+1}$ and the pixel $P_{i+1,j+2}$ are a mean value of the initial driving voltage thereof; the driving voltages of the pixel $P_{i+2, j}$, the pixel $P_{i+2, j+1}$ and the pixel $P_{i+2, j+2}$ are a mean value of the initial driving voltage thereof. As another example, the timing control circuitry processes the initial driving voltage signal for each of pixel subunits such that the processed driving voltages of the pixel $P_{i, j}$, the pixel $P_{i+1, j}$ and the pixel $P_{i+2, j}$ are a mean value of the initial driving voltages thereof; the driving voltages of the pixel $P_{i, j+1}$, the pixel $P_{i+1, j+1}$ and the pixel $P_{i+2, j+1}$ are a mean value of the initial driving voltage thereof; the driving voltages of the pixel $P_{i, j+2}$, the pixel $P_{i+1, j+2}$ and the pixel $P_{i+2, j+2}$ are a mean value of the initial driving voltage thereof.

In another embodiment, the blue color filters of the blue pixel subunits of the nine pixel units in the same pixel region have different thicknesses, which means that the blue color filters have nine different film thicknesses in the same pixel area. At this time, the timing control circuitry may process the initial driving voltage for each of the pixel subunits to convert the driving voltage of each of the blue pixel subunits into the mean value of the initial driving voltages of the nine blue pixel subunits, and output the processed driving voltage signal at the displaying time in the next frame or the subsequent frame thereof.

As an embodiment, each of the pixel regions comprises sixteen pixel units arranged in four columns and four rows that is the four pixel units are arranged in a 4×4 matrix; for example, the sixteen pixel units in the pixel region are arranged in the following matrix:

$$\begin{pmatrix} P_{i,j} & P_{i,j+1} & P_{i,j+2} & P_{i,j+3} \\ P_{i+1,j} & P_{i+1,j+1} & P_{i+1,j+2} & P_{i+1,j+3} \\ P_{i+2,j} & P_{i+2,j+1} & P_{i+2,j+2} & P_{i+2,j+3} \\ P_{i+3,j} & P_{i+3,j+1} & P_{i+3,j+2} & P_{i+3,j+3} \end{pmatrix}$$

In an embodiment, the matrix of the film thicknesses of the blue color filters in each of the blue pixel subunits corresponding to the pixel matrix arranged in four columns and four rows is:

$$\begin{pmatrix} B\text{-}CF44 & B\text{-}CF43 & B\text{-}CF42 & B\text{-}CF41 \\ B\text{-}CF43 & B\text{-}CF42 & B\text{-}CF43 & B\text{-}CF42 \\ B\text{-}CF42 & B\text{-}CF43 & B\text{-}CF42 & B\text{-}CF43 \\ B\text{-}CF41 & B\text{-}CF42 & B\text{-}CF43 & B\text{-}CF44 \end{pmatrix}$$

That is, the blue color filters of the blue pixel subunits of the pixel $P_{i, j}$ and the pixel $P_{j+3, j+3}$ have the same thickness, the blue color filters of the blue pixel subunits of the pixel $P_{i, j+1}$, the pixel $P_{i+1, j}$, the pixel $P_{i+1, j+2}$, the pixel $P_{i+2, j+1}$, the pixel $P_{i+2, j+3}$ and the pixel $P_{i+3, j+2}$ have the same thickness, the blue color filters of the blue pixel subunits of the pixel $P_{i, j+2}$, the pixel $P_{i+1, j+1}$, the pixel $P_{i+1, j+3}$, the pixel $P_{i+2, j}$, the pixel $P_{i+2, j+2}$ and the pixel $P_{i+3, j+1}$ have the same thickness, the blue color filters of the blue pixel subunits of the pixel $P_{i, j+3}$ and the pixel $P_{i+3, j}$ have the same thickness. In a preferred embodiment, B-CF44>B-CF43>B-CF42>B-CF41. As shown in FIG. 3, the four gap values are between the color filter and the TFT substrate of the blue pixel subunit in each of the pixel regions at this time and represented by B-Gap41, B-Gap42, B-Gap43 and B-Gap44 respectively from small to large and the corresponding amounts of phase delay are represented by $\Delta nd_{B\text{-}Gap41}$, $\Delta nd_{B\text{-}Gap42}$, $\Delta nd_{B\text{-}Gap43}$ and $\Delta nd_{B\text{-}Gap44}$ thereof respectively. The amounts of phase delay of the blue pixel subunit are actually equal to about mean value of $\Delta nd_{B\text{-}Gap41}$, $\Delta nd_{B\text{-}Gap42}$, $\Delta nd_{B\text{-}Gap43}$ and $\Delta nd_{B\text{-}Gap44}$ since the difference between B-Gap41, B-Gap42, B-Gap43 and B-Gap44, such that it can realize the complementary optical effect to compensate an affect caused by chromatic aberration at different viewing angles, thereby improving color shift at side viewing angles.

In order to realize a better color shift effect, as an embodiment, the timing control circuitry processes the initial driving voltage signal for each of the pixel subunits such that the processed driving voltages of the pixel $P_{i, j}$, the pixel $P_{i, j+1}$, the pixel $P_{i, j+2}$ and the pixel $P_{i, j+3}$ are equal to the mean value of the initial driving voltage thereof; the driving voltages of the pixel $P_{i+1, j}$, the pixel $P_{i+1, j+1}$, the pixel $P_{i+1, j+2}$ and the pixel $P_{i+1, j+3}$ are equal to the mean value of the initial driving voltages thereof; the driving voltages of the pixel $P_{i+2, j}$, the pixel $P_{j+2, j+1}$, the pixel $P_{i+2, j+2}$ and the pixel $P_{i+2, j+3}$ are equal to the mean value of the initial driving voltages thereof; the driving voltages of the pixel $Pi_{+3, j}$, the pixel $P_{i+3, j+1}$ and the pixel $P_{i+3, j+2}$ the pixel $P_{i+3, j+3}$ are equal to the mean value of the initial driving voltages thereof. As another embodiment, the timing control circuitry processes the initial driving voltage signal for each of the pixel subunits such that the processed driving voltages of the pixel $P_{i, j}$, the pixel $P_{i+1, j}$, the pixel $P_{i+2, j}$ and the pixel $P_{i+3, j}$ are equal to the mean value of the initial driving voltages thereof; the driving voltages of the pixel $P_{i, j+1}$, the pixel $P_{i+1, j+1}$, the pixel $P_{i+2, j+1}$ and the pixel $P_{i+3, j+1}$ are equal to the mean value of the initial driving voltages thereof; the driving voltages of the pixel $P_{i, j+2}$, the pixel $P_{i+1, j+2}$, the pixel $P_{i+2, j+2}$ and the pixel $P_{i+3, j+2}$ are equal to the mean value of the initial driving voltages thereof; the driving voltages of the pixel $P_{i, j+3}$, the pixel $P_{i+1, j+3}$, the pixel $P_{i+2, j+3}$ and the pixel $P_{i+3, j+3}$ are equal to the mean value of the initial driving voltages thereof.

In another embodiment, the blue color filters of the sixteen pixel units in the same pixel region have different thicknesses, which mean that the blue color filters have sixteen different film thicknesses in the same pixel area. At this time, the timing control circuitry may process the initial driving voltage for each of the pixel subunits to convert the driving voltage of each of the blue pixel subunits into the mean value of the initial driving voltages of the sixteen blue pixel subunits, and output the processed driving voltage signal at the displaying time in the next frame or the subsequent frame thereof.

In an embodiment, the green pixel subunit is located in the middle of the red pixel subunit and the blue pixel subunit in each of the pixel units. As such, it is advantageous that the three primary colors of red, green and blue are mixed to obtain various colors.

The array substrate provided in the present application, for example, may be applicable to a liquid crystal display panel, an organic light-emitting diode (OLED) display panel, a quantum dot light-emitting diode display panel, a curved-surface display panel or a flexibility display panel, etc. Further, for example, the liquid crystal display panel may be a twisted nematic (TN-) type liquid crystal display panel, an optically complementary birefringence (OCB) type liquid crystal display panel and a vertical alignment (VA) type liquid crystal display panel, etc.

Figure 6A:
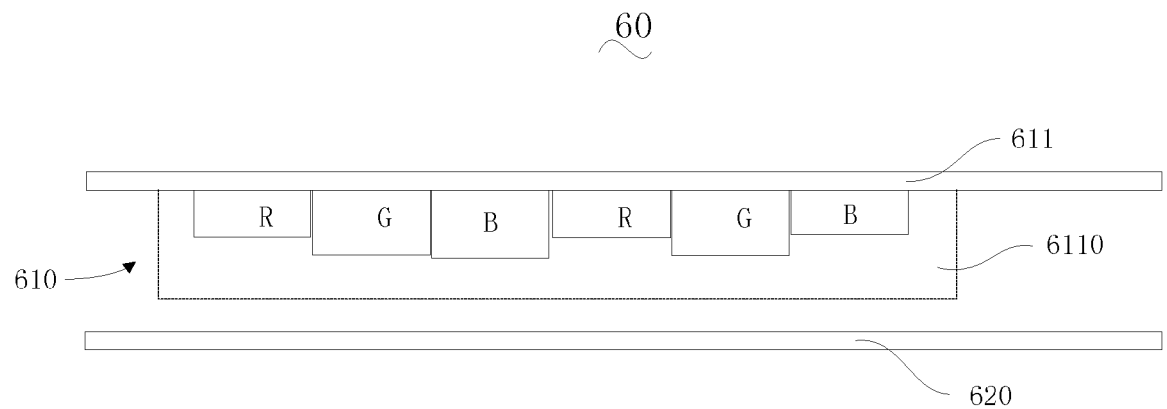
FIG. 6a is a schematic structural diagram of a display panel of an embodiment.
Figure 6B:
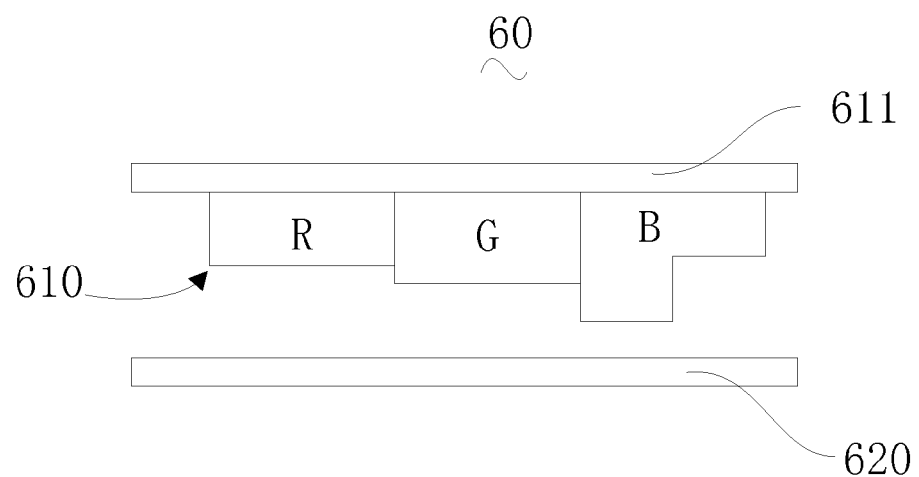
FIG. 6b is a schematic structural diagram of a display panel of another embodiment.

The present application further discloses a display panel, please refer to FIG. 6*a* and FIG. 6*b* together, the display panel 60 comprises a first substrate 610 and a second substrate 620 disposed to oppose each other, wherein the first substrate 610 comprises a substrate 611; a plurality of pixel units disposed on the substrate, wherein each of the pixel units comprise a first pixel subunit, a second pixel subunit and a third pixel subunit, for example, each of the pixel units comprise a red pixel subunit, a green pixel subunit and a blue pixel subunit. The color filter is disposed on each of the pixel subunits, and the color filters of the different pixel subunits in the same pixel unit are made of different materials such that the different pixel subunits in the same pixel unit emit light having the different colors. For example, a red color filter R is disposed on the red pixel subunit, a green color filter G is disposed on the green pixel subunit, and a blue color filter B is disposed on the blue pixel subunit.

As an embodiment, as shown in FIG. 6a, the plurality of pixel regions 6110 are disposed on the substrate 611, each of the pixel regions comprises a plurality of pixel units, specifically, the blue color filters of the two adjacent blue pixel subunits in each of the pixel regions 6110 have different thicknesses.

As another embodiment, as shown in FIG. 6b, the color filter of the third pixel subunit has a step structure that is the blue color filter B has the step structure; for example, the color filter of the third pixel subunit has a multi-layered step structure, the step structures on the same layer have the same thickness; further, for example, for the step structures of the two adjacent layers, the thickness of the step structure on the lower layer is larger than that on the upper layer.

As an embodiment, the display panel comprises a first substrate and a second substrate disposed opposite to the first substrate; the first substrate comprises a substrate and a light-shielding member formed on the substrate having an opening, and a plurality of pixel units are disposed on the substrate; wherein each of the pixel units comprises a first pixel subunit, a second pixel subunit and a third pixel subunit; and the second pixel subunit is disposed between the first pixel subunit and the third pixel subunit; each of the pixel subunits of the substrate has a color filter disposed at the opening of the light-shielding member, the color filter is located between the substrate and the second substrate, and the color filter of the third pixel subunit has an at least three-layered step structure; and a thickness of the at least three-layered step structure uniformity decreases or gradually decreases at a curve along a direction away from the second pixel subunit.

For example, the structure of the first substrate is as same as that of the array substrate described in any one of the aforementioned embodiments. Optionally, a TFT array is also disposed on the first substrate 610 or on the second substrate 620. Wherein, the TFT array is optionally a TFT array having a bottom gate structure or a top gate structure.

In an embodiment, liquid crystal material is filled between the first substrate 610 and the second substrate 620 to form a liquid crystal display panel.

According to the embodiments of the present application, the structures of the blue pixel subunits are adjusted for the optical characteristic of the blue pixel subunits, when the blue color filters are adjusted to have a step structure, the short wavelength and high color shift conditions are compensated so as to realize a complementary optical effect, thereby solving the chromatic aberration and color shift problems of the display panel. The manufacturing processes for the aforementioned array substrate are simple and can improve the display performance of the display device.

The array substrate provided in the present application may be a liquid crystal display panel, an OLED display panel, a QLED display panel, a curved-surface display panel or a flexible display panel, etc. Further, for example, the liquid crystal display panel may be a twisted nematic (TN-) type liquid crystal display panel, an optical compensated birefringence (OCB) type liquid crystal display panel and a vertical alignment (VA) type liquid crystal display panel, etc.

Please refer to FIG. 7, which is a schematic structural diagram of a display device of an embodiment. The display device 70 comprises a display panel 71, a driver board 72 and a data receiving chip 73, the data receiving chip 73 and the display panel 71 are connected to each other, the display panel 71 comprises the array substrate described in any one of the above embodiments. For example, the display panel 71 is the display panel shown in FIG. 6a or FIG. 6b; further, for example, the display panel 71 comprises a first substrate and a second substrate disposed to oppose each other, the first substrate comprises a substrate; a plurality of pixel regions disposed on the substrate, wherein each of the pixel regions comprises a plurality of pixel units each including a red pixel subunit, a green pixel subunit and a blue pixel subunit; and a plurality of color filters each disposed on each of the pixel subunits, for example, a red color filter is disposed on the red pixel subunit, a green color filter is disposed on the green pixel subunit, and a blue color filter is disposed on the blue pixel subunit.

Optionally, the color filter of the third pixel subunit of each of the pixel units has a step structure. Alternatively, the blue color filters of the two adjacent blue pixel subunits have different thicknesses in each of the pixel regions.

For example, the display panel comprises the array substrate described in any one of the above embodiments. Further, for example, a TFT array is also disposed on the first substrate or on the second substrate, wherein the TFT array may be selected as a TFT array having a bottom gate structure or a top gate structure.

In an embodiment of the present application, the driver board 72 comprises a timing control circuitry 721, the timing control circuitry 721 and the data receiving chip 73 are connected to each other, the timing control circuitry 721 is configured to process the initial driving voltage signal for each of the pixel subunits when the blue color filters of the two adjacent blue pixel subunits have different thicknesses in each of the pixel regions, such that the driving voltages of the plurality of blue pixel subunit in the same pixel region are same, and output the processed driving voltage signal to the data receiving chip.

In an embodiment, the timing control circuitry 721 is configured to process the initial driving voltage signals for each of the pixel subunits, such that the processed driving voltage of the plurality of blue pixel subunits at the same column/row in the same pixel region is equal to the mean value of the initial driving voltages of the blue pixel subunits in the pixel region, and output the processed driving voltage signal to the data receiving chip.

In an embodiment, the timing control circuitry 721 is further configured to output the processed driving voltage signal to the data receiving chip at the displaying time of the next frame after processing the initial driving voltage signal for each of the pixel subunits.

For example, the timing control circuitry 721 comprises a signal processing unit and a storage unit, the signal processing unit is configured to process the initial driving voltage signal for each of the pixel subunits such that the processed driving voltages of the plurality of blue pixel subunits at the same column/row in the same pixel region are same; the storage unit is connected to the signal processing unit, and configured to receive and store the processed driving voltage signal and output the processed driving voltage signal at the displaying time of the next frame.

In an embodiment of the present application, the timing control circuitry 721 receives an image data signal and processes the received image data signal to convert the type of the image data signal into other type of the image data signal supported by the data receiving chip, and outputs the processed image data signal to the data receiving chip of the display panel. The processed image data signal not only includes the driving voltage signal of each of the pixel subunits, but also includes a scanning signal.

In the embodiments of the present application, the structures of the blue pixel subunits are adjusted for the optical characteristic of the blue pixel subunits, when the blue color filters in the same pixel region are adjusted to have different thicknesses, the short wavelength and high color shift conditions are compensated so as to realize a complementary optical effect, thereby solving the chromatic aberration and color shift problems of the display panel.

In the embodiments of the present application, the display device may be a liquid crystal display device, an OLED display device or a QLED display device, a curved-surface display device, a flexible display device, etc. Further, for example, the liquid crystal display device may be a twisted nematic (TN-) type liquid crystal display panel, an optical compensated birefringence (OCB) type liquid crystal display panel and a vertical alignment (VA) type liquid crystal display panel, etc.

The technical features of the above embodiments can be arbitrarily combined to make the concise description; possible combinations of the technical features in the aforementioned embodiments are not all described. However, these technical features should be covered by the appended claims as long as the combinations of these technical features do not contradict each other.

A number of the specific implementations of the present application are described in detail in the above embodiments. However, it should not be interpreted in any way that limits the scope of the present application. It should be noted that any equivalent modification or change can be made to the technical features described herein without departing from the scope and the spirit of the present application and is covered by the appended claims. Therefore, the protection scope of the present application should be subjected to the scope defined by the appended claims.

What is claimed is:

1. An array substrate, comprising:
   a substrate;
   a plurality of pixel units disposed on the substrate, wherein each of the pixel units comprises a first pixel subunit, a second pixel subunit and a third pixel subunit; and
   a color filter disposed on each of the pixel subunits,
   wherein the color filter is located between the substrate and a second substrate, and the color filter of the third pixel subunit has a stepped surface with a step structure and monotonically decreases in thickness in one direction, and a surface opposite to the stepped surface thereof is a flat surface;
   wherein the third pixel subunit and the second pixel subunit are disposed adjacent to each other in each of the pixel units, and a thickness of the step structure decreases along a direction away from the second pixel subunit;
   wherein the color filter of the third pixel subunit has an at least three-layered step structure;
   wherein a thickness of the at least three-layered step structure uniformity decreases along the direction away from the second pixel subunit.

2. The array substrate of claim 1, wherein the array substrate further comprises:
   a light-shielding member formed on the substrate, and having an opening;
   the color filter being disposed at the opening of the light-shielding member.

3. The array substrate of claim 1, wherein the first pixel subunit, the second pixel subunit and the third pixel subunit have a same contacting area with the substrate respectively.

4. A display panel, comprising:
   a first substrate; and
   a second substrate disposed opposite to the first substrate;
   the first substrate comprises:
   a substrate;
   a plurality of pixel units disposed on the substrate, wherein each of the pixel units comprises a first pixel subunit, a second pixel subunit and a third pixel subunit; and
   a color filter disposed on each of the pixel subunits,
   wherein the color filter is located between the substrate and the second substrate, and the color filter of the third pixel subunit has a stepped surface with a step structure and monotonically decreases in thickness in one direction, and a surface opposite to the stepped surface thereof is a flat surface;
   wherein the third pixel subunit and the second pixel subunit are disposed adjacent to each other in each of the pixel units, and a thickness of the step structure decreases along a direction away from the second pixel subunit;
   wherein the color filter of the third pixel subunit has an at least three-layered step structure;
   wherein a thickness of the at least three-layered step structure uniformity decreases along a direction away from the second pixel subunit.

5. The display panel of claim 4, wherein the first substrate further comprises:
   a light-shielding member formed on the substrate, and having an opening;
   the color filter being disposed at the opening of the light-shielding member.

6. The display panel of claim 4, wherein the first pixel subunit, the second pixel subunit and the third pixel subunit have a same contacting area with the substrate respectively.

* * * * *